April 12, 1966 G. J. MASHY ETAL 3,245,572
STORAGE AND DISPENSING CASE
Filed Sept. 6, 1963

INVENTORS
GEORGE J. MASHY
FRANCIS J. MILLER
BY
ATTORNEY.

3,245,572
STORAGE AND DISPENSING CASE
George J. Mashy and Francis J. Miller, San Francisco, Calif., assignors to The Borden Company, New York, N.Y., a corporation of New Jersey
Filed Sept. 6, 1963, Ser. No. 307,057
1 Claim. (Cl. 220—19)

This invention relates to a storage and dispensing case for packaged foods and, more particularly, to a case for storing and dispensing dairy product containers.

Containers of dairy products or packaged foods such as cream, milk, skim milk, cheeses and the like, whether of glass, paperboard, or plastic construction, are conventionally placed in cases at the plant and stored and transported in such cases. While such cases heretofore used are generally satisfactory when used for storing and transporting containers they are unsuitable for dispensing the containers. When stacked one on top of the other in refrigerated dairy cabinets, in the case of dairy products, commonly found in food markets the purchaser has access to containers in the topmost case only. Consequently, such containers are seldom, if ever, displayed in their cases.

In conventional practice the containers are removed from the cases and placed in the dairy cabinets. This procedure is time-consuming and, consequently, costly. Moreover, dairy products, in many areas, must, because of prevailing health regulations, be removed from the dairy display case if not sold within a certain period of time. This return milk, cream, and the like must be placed back into a case for removal from the store; another lengthy and expensive procedure.

It is proposed according to the present invention to overcome the foregoing difficulties and to provide a case with a movable panel for storing, transporting, and dispensing containers of food products, particularly milk, that is characterized by working satisfactorily in automatic casing, stacking, and material handling equipment, now in use, and which can be placed in the dairy case of any food store for dispensing of the containers therein to consumers.

Other objects and advantages of the invention will be apparent from the following specification and accompanying drawings which are for the purpose of illustration only and in which.

Figure 1:
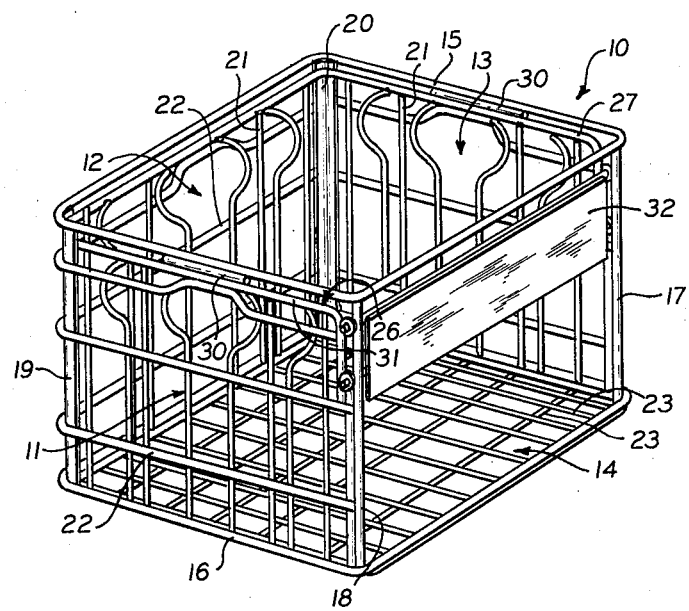
FIG. 1 is a perspective view of a case of the invention with the panel in the container retaining position.

Referring particularly to the drawings there is shown a case comprising an upstanding box-like structure, indicated at 10, made of resilient wire grille and open to the top and front.

The case includes substantially square upper and lower frames 15 and 16 formed of heavy gauge wire and supported in spaced parallel relation by posts 17, 18, 19 and 20 also formed of heavy gauge wire and secured to the frames as by welding.

Also acting to reinforce the frames and posts are longitudinal supports 21 and vertical supports 22, suitably wire of a lighter gauge than that of the frame 15 and 16, which form sides 11, 12, and 13 of the case. The supports 21 and 22 are preferably attached to the frames and posts by welding. A rigid grille is formed by welding the longitudinal supports 21 to the vertical supports 22.

Figure 2:
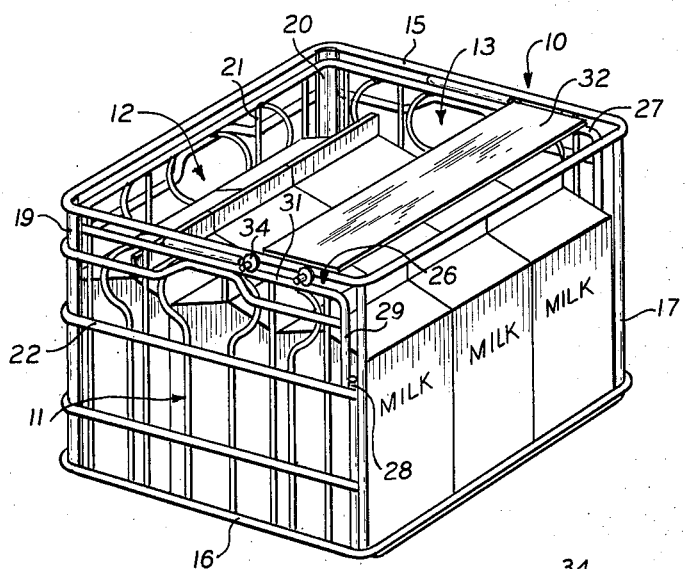
FIG. 2 is a perspective view of a case of the invention showing it in a dispensing position with containers of milk therein.
Figure 3:
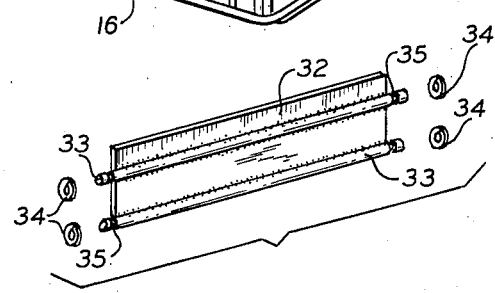
FIG. 3 is a perspective view of the panel shown in FIG. 1 in reversed position.

In like manner, a bottom 14 is made of wire and consists of cross supports 23 welded together and to the bottom frame 16. In order to assist in preventing the containers from falling out of the case the bottom 14 is attached to the bottom of frame 16. Frame 16 thus also acts as a retaining lip to help keep the containers in the case as best shown in FIG. 2.

Sides 11 and 13, are each provided with right angle tracks 26 and 27 which are in spaced parallel relation. The tracks 26 and 27 consist of vertical rails 29 extending along portions of sides 11 and 13 in spaced parallel relation to posts 17 and 18. Connected at right angles to the vertical rails 29 are horizontal rails 31 which extend along and are in spaced parallel relation to the upper frame 15. Vertical stops 28 are welded between the vertical rails 29 and posts 17 and 18 and horizontal stops 30 are welded between the horizontal rails 31 and the upper frame 15 to limit movement of a retaining element as described later herein. In the invention illustrated, the tracks extend along approximately one-third the distance along the upper frame 15 and posts 17 and 18 respectively. This is to permit a retaining element 32 to extend far enough in its vertical position (shown in FIG. 1) so as to retain the containers in the case 10.

The retaining element 32, preferably a metal panel, extends between tracks 26 and 27 and is provided with lugs 33 welded thereto which ride in the tracks 26 and 27. The panel is prevented from lateral movement by lock washers 34 which snap into grooves 35 in the legs 33. The washers 34 are of a size larger than the space between the vertical rails 29 and posts 17 and 18 and horizontal rails 31 and upper frame 15 in order to keep the retaining element in the tracks. The location of the lugs 33 and width of the panel 32 are correlated to the length of the tracks 26 and 27 to permit movement of the panel 32 from a horizontal to a vertical position, and vice versa, as described below.

The operation of the case 10 is evident from the description given above. When the case 10 is to be filled with containers, such as milk containers, the panel 32 is moved along tracks 26 and 27 to the vertical or loading and storage position as illustrated in FIG. 1. The location and width of the panel is such as to prevent the milk containers from falling out of the case 10 as it is lifted, moved about, or even tilted. In this regard the frame 16, as noted above, also acts to prevent the containers from sliding or falling out of the case 10.

When the cases are placed in a dairy case either alone or stacked one on top of the other the panel 32 is moved along tracks 26 and 27 to the horizontal or dispensing position illustrated in FIG. 2. The consumers are then readily able to reach into the case 10 from the front to grasp and remove the milk containers.

While what has been shown and described herein is what is conceived to be the most desired form of the invention, it is to be understood that modifications thereof may be made to satisfy the scope and spirit of the invention. For example, the cases may be constructed of wood, plastic, metal and combinations thereof.

It will be understood that it is intended to cover all changes and modifications of the examples of the invention herein chosen for the purpose of illustration which do not constitute departures from the spirit and scope of the invention.

What is claimed is:

A stackable case for storing and dispensing containers of dairy products comprising spaced upper and lower frames having four substantially equal sides, corner posts connecting said frames, a plurality of interconnected wires secured to three corresponding sides of the frames, the corner posts, and across the lower frame to constitute three sides and a bottom of the case, the fourth side and top of the case being open, wire means defining a substantially right angle track extending along the portions of each of the two sides of the case contiguous with the open side and top of the case, a retaining lip placed across the bottom of the open side of the case, and a panel movably mounted in and extending between said tracks, said panel adapted to move back and forth on the tracks from a horizontal position at the top of the case to provide access to the containers through the front of the case and to a vertical position at the open side of the case to retain the containers in the case when said case is stacked and unstacked.

References Cited by the Examiner

UNITED STATES PATENTS

| | | | |
|---|---|---|---|
| 641,459 | 1/1900 | Macey | 312—107 |
| 1,855,953 | 4/1932 | Fridrich. | |
| 2,450,593 | 10/1948 | Hormes | 312—138 |
| 2,496,918 | 2/1950 | Promisel | 217—11 |
| 2,796,227 | 6/1957 | Coakley | 248—264 |
| 2,802,589 | 8/1957 | Voight | 220—19 |
| 3,091,355 | 5/1963 | Mutto | 220—97 |

FOREIGN PATENTS 24,422   12/1899   Great Britain.

THERON E. CONDON, *Primary Examiner.*

GEORGE O. RALSTON, *Examiner.*